US 11,087,264 B2

(12) United States Patent
Gil et al.

(10) Patent No.: US 11,087,264 B2
(45) Date of Patent: Aug. 10, 2021

(54) CROWDSOURCING OF MEETINGS

(71) Applicant: International Business Machines Corporation, Armonk, NY (US)

(72) Inventors: Dario Gil, Katonah, NY (US); Jeffrey O. Kephart, Cortlandt Manor, NY (US); James R. Kozloski, New Fairfield, CT (US); David O. S. Melville, New York, NY (US); Clifford A. Pickover, Yorktown Heights, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1297 days.

(21) Appl. No.: 14/658,578

(22) Filed: Mar. 16, 2015

(65) Prior Publication Data
US 2016/0275433 A1    Sep. 22, 2016

(51) Int. Cl.
*G06F 17/00* (2019.01)
*G06Q 10/06* (2012.01)
*G06F 40/30* (2020.01)

(52) U.S. Cl.
CPC ....... *G06Q 10/06395* (2013.01); *G06F 40/30* (2020.01)

(58) Field of Classification Search
CPC .......... G06Q 10/06395; G06F 17/2785; G06F 17/30657; G06F 40/30
See application file for complete search history.

(56) References Cited

U.S. PATENT DOCUMENTS

| | | | |
|---|---|---|---|
| 2009/0210351 A1* | 8/2009 | Bush | G06Q 10/109 705/80 |
| 2012/0123811 A1* | 5/2012 | Socolof | G06Q 30/02 705/5 |
| 2012/0173621 A1 | 7/2012 | Crosbie et al. | |
| 2013/0151614 A1 | 6/2013 | Beerse et al. | |
| 2013/0202163 A1* | 8/2013 | Shimada | G06K 9/00268 382/118 |
| 2013/0317874 A1 | 11/2013 | Kozloski et al. | |
| 2014/0280224 A1* | 9/2014 | Feinberg | G06F 17/30958 707/748 |

(Continued)

FOREIGN PATENT DOCUMENTS

| | | |
|---|---|---|
| WO | 2009105298 A2 | 8/2009 |
| WO | 2012088230 A1 | 6/2012 |

*Primary Examiner* — Laurie A Ries
(74) *Attorney, Agent, or Firm* — Nicholas Cadmus; Brian M. Restauro

(57) ABSTRACT

The method includes receiving a first set of data from a first client device. The method further includes determining a first topic from the first set of data. The method further includes generating a first productivity value for the first topic. The method further includes receiving a second set of date data from a second client device. The method further includes determining a second topic from by the second set of data. The method further includes generating a second productivity value for second set of data. The method further includes comparing the first topic to the second topic. The method further includes in response to comparing the first topic and the second topic and determining the difference between the first productivity value and the second productivity value is above a threshold value, triggering an action.

20 Claims, 6 Drawing Sheets

(56) References Cited

U.S. PATENT DOCUMENTS

| | | | | |
|---|---|---|---|---|
| 2014/0282285 A1* | 9/2014 | Sadhvani | .................. | G06F 8/38 |
| | | | | 715/865 |
| 2014/0358891 A1* | 12/2014 | Anstandig | .......... | G06Q 30/0201 |
| | | | | 707/710 |
| 2015/0170248 A1* | 6/2015 | Chung | ................ | G06F 17/3053 |
| | | | | 705/26.63 |
| 2015/0381552 A1* | 12/2015 | Vijay | ...................... | H04L 51/32 |
| | | | | 709/206 |
| 2016/0042061 A1* | 2/2016 | Sengupta | .............. | G06F 17/278 |
| | | | | 707/738 |
| 2016/0188590 A1* | 6/2016 | Cole | .................. | G06F 17/3087 |
| | | | | 707/747 |
| 2016/0188703 A1* | 6/2016 | Huang | ................... | G06F 16/35 |
| | | | | 707/750 |

* cited by examiner

CROWDSOURCING OF MEETINGS

BACKGROUND OF THE INVENTION

The present invention relates generally to crowdsourcing of meetings, and more particularly to the crowdsourcing of meeting topics.

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding, that is, enabling computers to derive meaning from human or natural language input, and others involve natural language generation.

In NLP, latent Dirichlet allocation (LDA) is a generative model that allows sets of observations to be explained by unobserved groups that explain why some parts of the data are similar. For example, if observations are words collected into documents, LDA posits that each document is a mixture of a small number of topics and that each word's creation is attributable to one of the document's topics.

SUMMARY OF THE INVENTION

Embodiments of the present invention disclose a method for comparing a plurality topics to trigger an action. In one embodiment, in accordance with the present invention, the computer-implemented method includes receiving a first set of data from a first client device. The method further includes determining a first topic from the first set of data. The method further includes generating a first productivity value for the first topic. The method further includes receiving a second set of date data from a second client device. The method further includes determining a second topic from by the second set of data. The method further includes generating a second productivity value for second set of data. The method further includes comparing the first topic to the second topic. The method further includes determining a difference between the first productivity value and the second productivity value. The method further includes in response to comparing the first topic and the second topic and determining the difference between the first productivity value and the second productivity value is above a threshold value, triggering an action.

Embodiments of the present invention disclose a computer program product for comparing a plurality topics to trigger an action. In one embodiment, in accordance with the present invention, the computer-implemented program product includes receiving a first set of data from a first client device. The computer program product further includes determining a first topic from the first set of data. The computer program product further includes generating a first productivity value for the first topic. The computer program product further includes receiving a second set of date data from a second client device. The computer program product further includes determining a second topic from by the second set of data. The computer program product further includes generating a second productivity value for second set of data. The computer program product further includes comparing the first topic to the second topic. The computer program product further includes determining a difference between the first productivity value and the second productivity value. The computer program product further includes in response to comparing the first topic and the second topic and determining the difference between the first productivity value and the second productivity value is above a threshold value, triggering an action.

Embodiments of the present invention disclose a computer system for comparing a plurality topics to trigger an action. In one embodiment, in accordance with the present invention, the computer-implemented system includes receiving a first set of data from a first client device. The computer system further includes determining a first topic from the first set of data. The computer system further includes generating a first productivity value for the first topic. The computer system further includes receiving a second set of date data from a second client device. The computer system further includes determining a second topic from by the second set of data. The computer system further includes generating a second productivity value for second set of data. The computer system further includes comparing the first topic to the second topic. The computer system further includes determining a difference between the first productivity value and the second productivity value. The computer system further includes in response to comparing the first topic and the second topic and determining the difference between the first productivity value and the second productivity value is above a threshold value, triggering an action.

DETAILED DESCRIPTION OF THE PREFERRED EMBODIMENTS

The present invention provide the capability of notifying participants of the meeting that another meeting is discussing a similar topic and that the other meeting has more productive use and a better understanding of the topic being discussed.

Implementation of embodiments of the invention may take a variety of forms, and exemplary implementation details are discussed subsequently with reference to the Figures.

Figure 1:
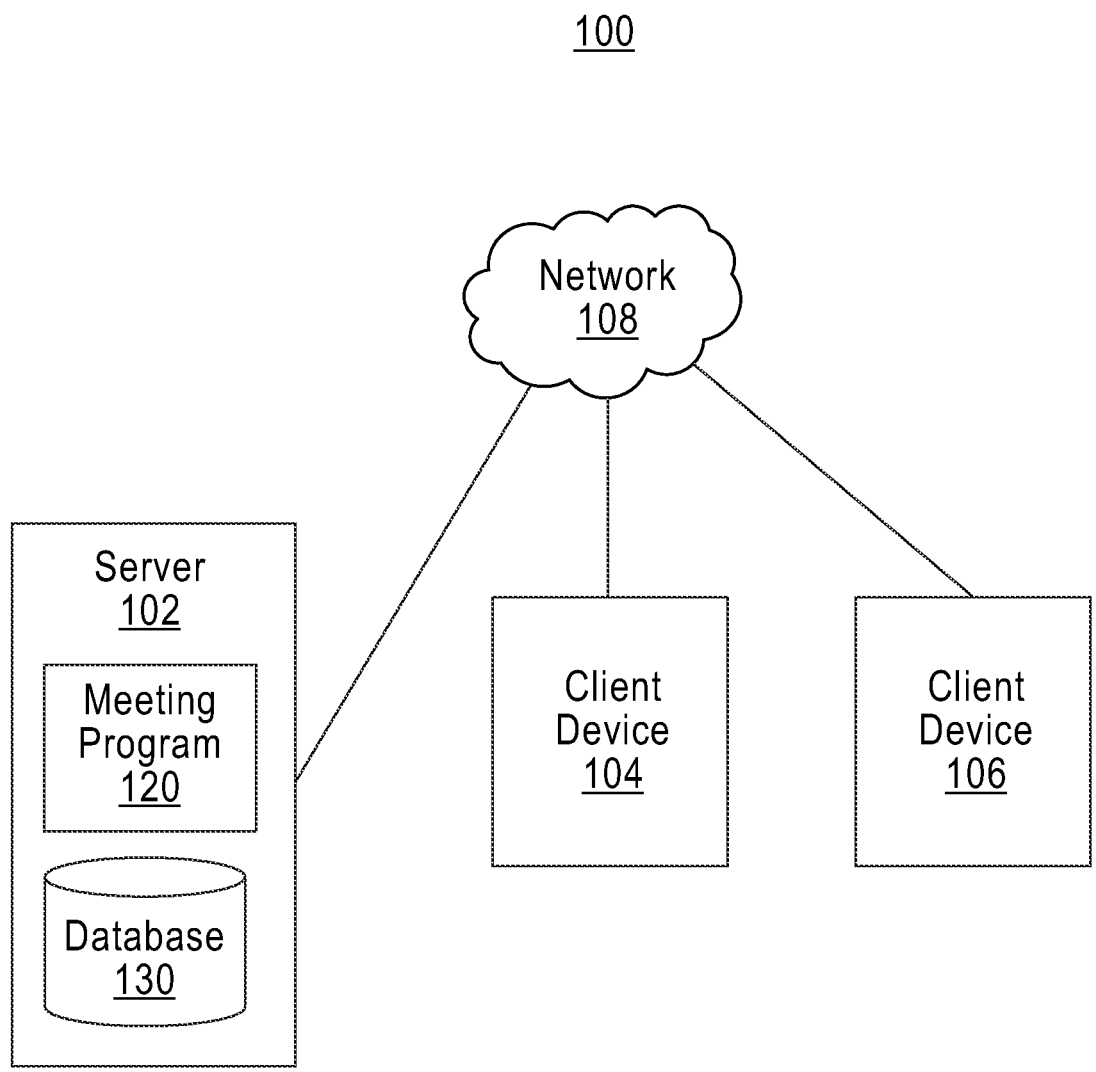
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102, client devices 104 and 106, all interconnected over network 108. Network 108 represents, for example, a telecommunications network, a local area network (LAN), a wide area network (WAN), such as the Internet, or a combination of the three, and includes wired, wireless, and/or fiber optic connections. Network 108 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving and sending data. In other embodiments, server 102 represents a server computing system utilizing multiple computers as a server system, such as in a cloud computing environment. In some embodiments, sever 102 can be represented as a node such as cloud computing node 410. In another embodiment, server 102 represents a laptop computer, a tablet computer, a netbook computer, a personal computer (PC), a desktop computer, a personal digital assistant (PDA), a smart phone, or any programmable electronic device capable of communicating with client device 104 and client device 106 via network 108. In another embodiment, server 102 represents a computing system utilizing clustered computers and components to act as a single pool of seamless resources. Server 102 includes meeting program 120 and database 130.

In the depicted embodiment, database 130 resides on server 102. In another embodiment, database 130 may reside elsewhere in distributed data processing environment 100, independently as a standalone database that is capable of communicating with server 102 via network 108. Database 130 may also reside on a client computing device, such as client devices 104 or 106. A database is an organized collection of data. Database 130 is implemented with any type of storage device capable of storing data that is accessed and utilized by server 102, such as a database server, a hard disk drive, or a flash memory. In other embodiments, database 130 represents multiple storage devices within server 102. Database 130 stores information, such as company personnel directories, calendar entries, meeting logs, meeting descriptions, presentations, personnel locations and phone numbers, meeting summaries, etc.

In the depicted embodiment, client devices 104 and 106 are one or more of a desktop computer, a laptop computer, a tablet computer, a specialized computer server, a smart phone, or any programmable electronic device capable of communicating with server 102, and another client device via network 108 and with various components and devices within distributed data processing environment 100. In general, client devices 104 and 106 represent any programmable electronic device or combination of programmable electronic devices capable of executing machine readable program instructions and communicating with other computing devices via a network, such as network 108. In an embodiment, client devices 104 and 106 each send a data stream which may comprise one or more of audio, video, digital presentation material, facial expressions, text, etc. to server 102 via network 108. In an example, client devices 104 and 106 are hosting separate meetings and sending separate live data streams to server 102 via network 108. In various examples, client devices 104 and 106 may each have teleconferencing software, video chat software, scanning software, etc. that enable client devices 104 and 106 to collect and send the data stream to server 102 via network 108.

In depicted distributed data processing environment 100, meeting program 120 resides on server 102 and identifies similar data streams from one or more client devices and determines if one data stream might be of use to participants of a meeting that created a second data stream or vice versa. In one embodiment, meeting program 120 receives a real time data stream of a first meeting from a first client device and determines the topics of discussion. Meeting program 120 also receives a real time data stream of a second meeting from a second client device and determines the topics of discussion. Meeting program 120 assigns a value based on the productive use and understanding participants of the meeting have of a topic being discussed in the meeting. Meeting program 120 then determines if the topics of discussion are similar for the first and second data streams and if it would be helpful to link the two meetings because one group may understand a topic while the other group does not understand the same topic.

In one embodiment of the present invention, meeting program 120 can make this determination by using latent Dirichlet allocation (LDA). LDA is a generative model that allows sets of observations to be explained by unobserved groups that explain why some parts of the data are similar. In an example, if observations are words collected into documents, LDA posits that each document is a mixture of a small number of topics and that each word's creation is attributable to one of the document's topics. In one example, meeting program 120 determines that the participants of the meetings should be joined because a threshold of polarity of productive use and understanding for the topics that are similar has been reached. Productive use and understanding is the determination meeting program 120 makes of the participant's mental grasp of a topic being discussed. For example, if the participants of a meeting were novices in a topic meeting program 120 may determine that the participants have a low productive use and understanding of the topic. Conversely, if the participants of the meeting are experts in a topic meeting program 120 may determine that the participants have a high productive use and understanding of the topic. Meeting program 120 sends an invite to both client devices to link the meetings.

In another embodiment, meeting program 120 can make this determination by using latent semantic analysis. Latent semantic analysis (LSA) is a technique in natural language processing, in particular in vectorial semantics, of analyzing relationships between a set of documents and the terms they contain by producing a set of concepts related to the documents and terms. In another embodiment, meeting program 120 can make the determination by using latent semantic indexing. Latent semantic indexing (LSI) is an indexing and retrieval method that uses a mathematical technique called singular value decomposition (SVD) to identify patterns in the relationships between the terms and concepts contained in an unstructured collection of text.

In another embodiment, meeting program 120 may identify similar topics using natural language processing and deem that the meetings are similar and therefore meeting program 120 will send an invite to both client devices based on the similarity alone. In one embodiment, one data stream or meeting topic may have happened previously, but meeting program 120 still determines if there is a match with the live data stream. In yet another embodiment, meeting program 120 determines there is a match after the two data streams are no longer live and sends a copy of the transcript or summary of the meeting to personnel involved in each meeting. In yet another embodiment, meeting program 120 is located on multiple client devices and operates in a peer to peer mode. Meeting program 120 is depicted and described in further detail with respect to FIG. 2.

Figure 2:
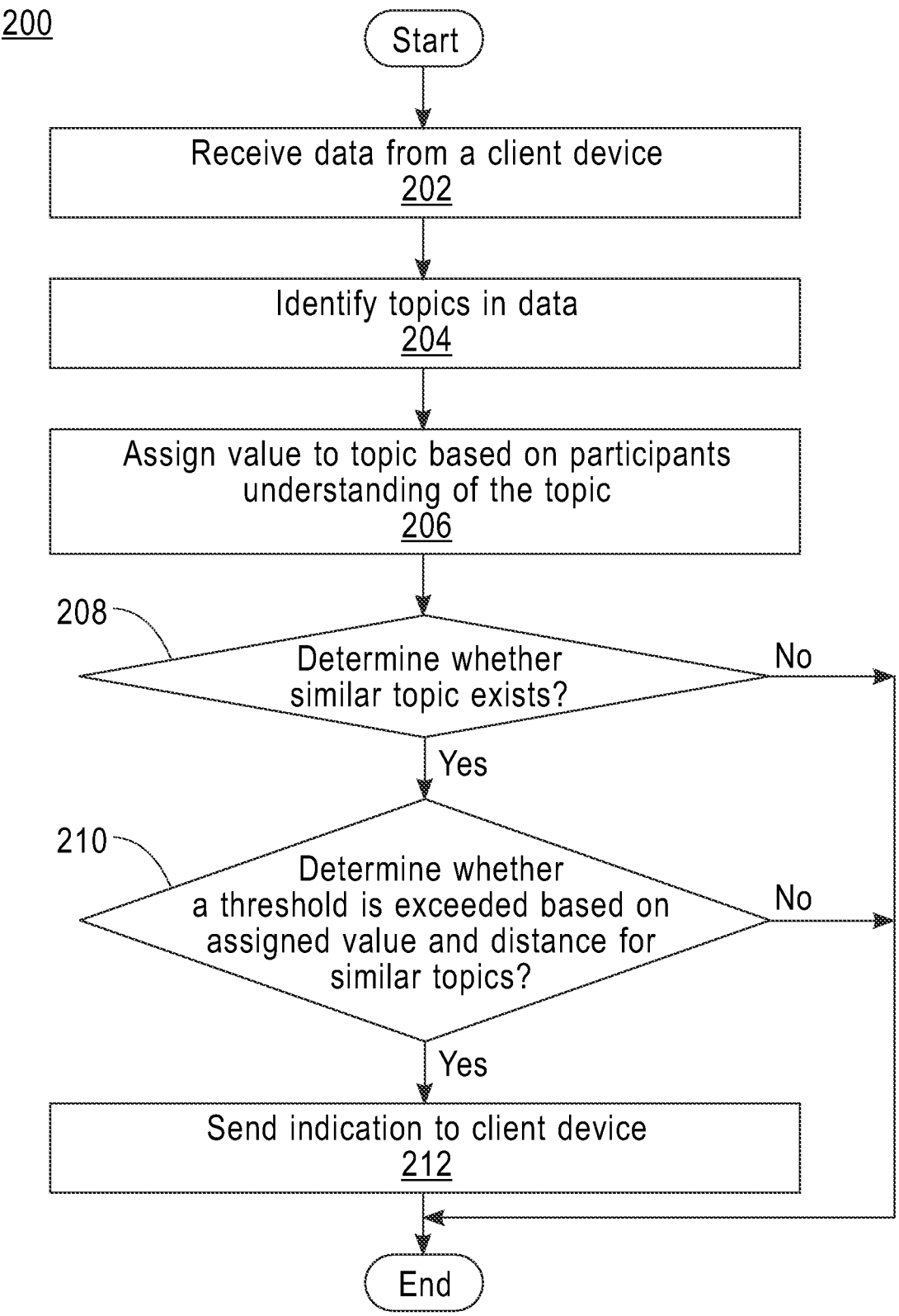
FIG. 2 is a flowchart depicting operational steps of a program for identifying similar data streams and determining if one data stream might be of use to the participants of a meeting that created a second data stream in accordance with an embodiment of the present invention.

FIG. 2 is a flowchart depicting operational steps of program 200, which is a function of meeting program 120, in accordance with an embodiment of the present invention. Meeting program 120 operates on server 102 and is used to identify similar data streams and determine if one data stream might be of use to the participants of a meeting that created a second data stream or vice versa. In one embodiment, meeting program 120 monitors multiple data streams and determines the similarity of the data being discussed as well as the productive use and understanding the creators of the data stream have of the topics being discussed. In one embodiment, meeting program 120 initiates in response to receiving a data stream from a client device. In another embodiment, meeting program 120 constantly monitors multiple client devices in an enterprise environment and begins the operational steps of FIG. 2 when server 102 receives a new data stream from a client device (e.g., client device 104).

Meeting program 120 receives data from a client device (step 202). In one embodiment, meeting program 120 receives data from client device 104, via network 108. In an example, client device 104 is located in a conference room for a meeting. Client device 104 has a microphone to gather audio data, one or more cameras to gather video of the participants of the meeting, various sensors that may record heat signatures or shifting in seats, gaze tracking devices, or any other data sources known by someone skilled in the art. Client device 104 may also scan documents that are presented during the meeting. In this example, client device 104 continuously sends the data from the meeting to server 102 and meeting program 120 in real time. In one embodiment, meeting program 120 may receive data from multiple client devices that are collecting data from a singular meeting and sending the collected data to meeting program 120. In an example, the multiple client devices, such as client device 104 and other client devices (not depicted), that are collecting data may have a meeting location or number associated with the client devices as to reflect that they are associated with the singular meeting. In another embodiment, the multiple client devices may include in the data that is sent to meeting program 120 a reference or title stating that the collected data is related to the singular meeting or any other method that is that is known by a person skilled in the art. In another embodiment, meeting program 120 receives data from multiple client devices collecting data from multiple meetings. In various embodiments, the meeting may take place in a conference room, on a phone, via video chat, or any other method known by one skilled in the art.

Meeting program 120 identifies one or more original topics in the data (step 204). In an embodiment in which audio data is received by meeting program 120, audio data is converted to text to aid in identifying an original topic. In an example, meeting program 120 receives a live audio feed from client device 104 and converts the audio data to text using hidden Markov models, dynamic time warping, latent Dirichlet allocation (LDA), or any other method known by a person skilled in the art. In another embodiment, meeting program 120 identifies an original topic that has been or is being discussed in a meeting. For the purposes of this application, original topic is any topic being discussed in a meeting and the data relating to that meeting is sent to meeting program 120 by software collecting the data on client device 104. In one example, meeting program 120 continuously reviews the new data that is being received in real time to identify an original topic being discussed. In this example, meeting program 120 utilizes LDA to identify the original topic being discussed. In another example meeting program 120 may identify the original topic based on each word that is used to identify the original topic of discussion (e.g., meeting program 120 would identify an original topic of "cat" when words such as kitten, whiskers, milk, hair, claws, and tail are used within a short amount of time, such as 1 minute.) Meeting program 120 may also identify the original topic of discussion from audio data converted into text by searching for key words, the number of words used, latent semantic analysis (LSA), and/or, in documents or pictures with picture recognition, and/or graphical text analysis, or any other method known by a person skilled in the art.

In one embodiment, meeting program 120 may track the evolution of the topic during a meeting as it evolves from one topic to the next. In an example, meeting program 120 may plot the topic on a multidimensional space and track the topic which has an evolving present end and a dispersing past end. The plot may resemble a comet, which has a wide tail, or passed points on the plot because the topic was discussed in broad terms; however, the most current point may be small as only one small bit of information pertaining to the topic has been discussed, such as in FIG. 3. In another example, the plotted points may depict a broad line for broad discussions of a topic and a narrow line for narrowing discussions of a topic. By plotting the topic, meeting program 120 may be able to make future predictions on how the topic is trending and make a prediction on what the topic may be at a future time as well as the future productive use and understanding of the topic by the participants. In another example, meeting program 120 may be able to determine if a meeting is going to conclude in the near future by analyzing previously received data, such as speech activity, measure of focus, content independent analysis, content interdependent analysis, physiological measure, and/or plotting of the trend of the original topic.

Meeting program 120 assigns a value to an original topic based on participants productive use and understanding of the original topic (step 206). In one embodiment, meeting program 120 assigns a value to represent the productive use and understanding by the participants of the meeting of the identified original topic based on the data previously collected by client device 104. In an example, the assigned value is a numerical value which has a positive sign for productive use and understanding of the topic and negative sign for less productive use and understanding of the topic. In an example, meeting program 120 uses a variety of methods independently or in conjunction to determine a value to represent the productive use and understanding comprising network analysis of text, focus of attention of meeting participants, mood analysis, total activity levels, the participant's physiological measures to an analysis of meeting dynamics across different predetermined dimensions, or any other methods known by someone skilled in the art. In another example, meeting program 120 determines the productive use and understanding of the topic by receiving data regarding polling information from participants of the meeting from client device 104, or another client device (not depicted). Examples of dimensions may comprise meeting directedness, cohesiveness, constructive discussion, urgency, etc. Meeting program 120 analyzes the data collected during the meeting from software located on client devices, such as client device 104, and based on the predetermined dimensions assigns a value for the understanding of the topic. For example, if the participants of the meeting are shifting in their seats, seem sluggish, yawning, etc., meeting program 120 may assign a negative value to represent less productive use and understanding of the topic. In another example, meeting program 120 may assign a negative productive use and understanding value if the participants of a meeting are debating a topic or volume of voices are raised. In another embodiment, the value for the original topic may continually evolve based upon the participants' productive use and understanding of the topic being discussed and the evolution of the topic itself.

Meeting program 120 determines whether data indicates a similar topic exists on a second client device (decision 208). In an embodiment, meeting program 120 compares data from a second client device to a first client device to determine if data received from a second client device (e.g., client device 106) indicates a topic is similar to the original topic. In an example, meeting program 120 identifies multiple topics occurring simultaneously in multiple separate but concurrent meetings, data from which are being received from multiple client devices (not depicted) by meeting program 120. In this example, meeting program 120 measures the distance between the topics in the separate but concurrent meetings to determine how similar the topics are to the original topic. Meeting program 120 determines the distance by using LDA, network analysis of text, image similarity detections, or any other method known by a person skilled in the art.

In another embodiment, meeting program 120 may determine if a similar topic was previously discussed in a meeting that is currently ongoing or that has already ended. In yet another embodiment, meeting program 120 may determine if an individual or group has a particular expertise in the original topic. In an example, where the original topic pertains to ship building, meeting program 120 may search a company database to determine if any personnel have listed a specialty in ship building or have published papers related to ship building, seaworthiness, etc.

If meeting program 120 determines that the data indicates that a similar topic does not exist on a second client device (no branch, decision 208), processing for program 200 completes. In an embodiment, data from the second client device is received similarly to how data is received in step 202. In an embodiment, if the original topic is not within a preset distance to the similar topic then meeting program 120 would go to end. In one embodiment, meeting program 120 does not have a preset threshold, but rather the assigned value of productive use and understanding of the topic from step 208 determines the distance needed to reach the threshold.

If meeting program 120 determines that the data indicates that a similar topic does exist on a second client device (yes branch, decision 208), processing continues to decision 210. In an embodiment, the original topic is within a threshold distance to a similar topic. For example, data received from client device 106 indicates that the topic being discussed is similar to data regarding a topic from client device 104. In this example, the distance between the two depicted topic points on a graph are within a threshold distance.

Meeting program 120 determines if a threshold is exceeded based on assigned value and distance for similar topics (decision 210). In an embodiment, meeting program 120 determines if the difference between the assigned value of the original topic from client device 104 and the assigned value for the similar topic from client device 106 meet or exceed a threshold. In an example, the data containing the original topic received from client device 104 has a −1 assigned value, and the data containing the similar topic received from client device 106 has a +2 assigned value. The determined similarity distance between the topics for the original topic and the similar topic is measured at 1. In this example, the threshold for the assigned value and distance is not exceeded, and the program goes to end (no branch, decision 210). In various embodiments, a variety of thresholds can be set. In one example, a threshold may be set based on a difference of 1 for an assigned value as long as the distance is under 0.5. In another example, there may be a ratio between the distance and the assigned value. If a value of −5 correlates to a meeting which is totally dysfunctional and the participants of the meeting lacking productive use and understanding of the topic, then the allowed distance value may be increased to allow for meeting program 120 to find a meeting in which the participants have a good productive use and understanding of a similar topic and may be of some help.

In one embodiment, meeting program 120 may also utilize information related to if a discussion of a topic has just begun, or the entire meeting is about to conclude. In an example, meeting program 120 may not conclude a topic that has exceeded the threshold if the meeting is about to adjourn or change topics. In various examples, meeting program 120 estimate that a meeting is about to conclude, or change topics. In another example, meeting program 120 determines that the threshold has been exceeded based on the assigned value and the distance for similar topic which triggers an action (yes branch, decision 210).

Meeting program 120 sends an indication to a client device (step 212). In an embodiment, when a threshold has been exceeded, such as yes branch, decision 210, an action is triggered which sends an indication to a client device. In an embodiment, meeting program 120 has previously determined that a threshold has been exceeded for an assigned value and the distance between the original topic and a similar topic for the meetings taking place on client device 104 and client device 106. In an example, the topic being discussed in the meeting for client device 104 has a high value assigned for productive use and understanding by the participants, and the meeting for client device 106 has a low value assigned for productive use and understanding by the participants. In this example, meeting program 120 may send an indication to client device 106, showing a display or some other form of notification that indicates another meeting is currently taking place in which the same topic is being discussed with a great productive use and understanding of the topic. In another example, the indication may first be sent to the client device which has the higher productive use and understanding of the topic being discussed to allow the members of the meeting to make themselves available to provide help on the topic.

In one embodiment, multiple available notifications may be displayed indicating the proposed helpfulness to the ongoing meeting. For example, three notifications may pop up on a screen indicating that three meetings are discussing the same topic. The notification may indicate a degree in which meeting program 120 rates that the meeting with the similar topic based on distance of topics and assigned values of productive use and understanding, such as numerically (e.g., 100%, 85%, 50%), color coordinated (green, yellow, red), etc. In an example, the notification may also include information such as the meeting location, the time and date the meeting took place, if it is not a live meeting, meeting participants, etc. In another example, the notification may include the ability to pause or rewind a feed, comment, store information, etc.

In one embodiment, the notification may appear blank, but as the topics become more similar, and/or the participant's productive use and understanding of the topic becomes more distant, a tunnel and/or linkage may appear, allowing participants of the notified meetings to have accesses to each other's meetings. In various examples, there may be a variety of security protocols or allowance to allow for the tunnel and/or linkage to form. In various embodiments, the notification tunnel and/or linkage may be in virtual world meetings and/or real world meetings, and the tunnel and/or linkage may allow for control of the flow of dialog, such as audio only, video only, both, avatar leap from virtual world onto the screen of a videoconference outside the virtual world, video display within the virtual world, etc.

In another embodiment, meeting program 120 may send an indication regarding a particular individual that might be helpful to the meeting based upon similar topics. In an example, meeting program 120 may determine, based on the assigned value of the original topic, that it is best to crowd source the topic to individuals that have relevant information to provide to the meetings. The crowd sourcing could be individuals, group meetings, company-wide, community-wide, country-wide, world-wide, etc.

Figure 3:
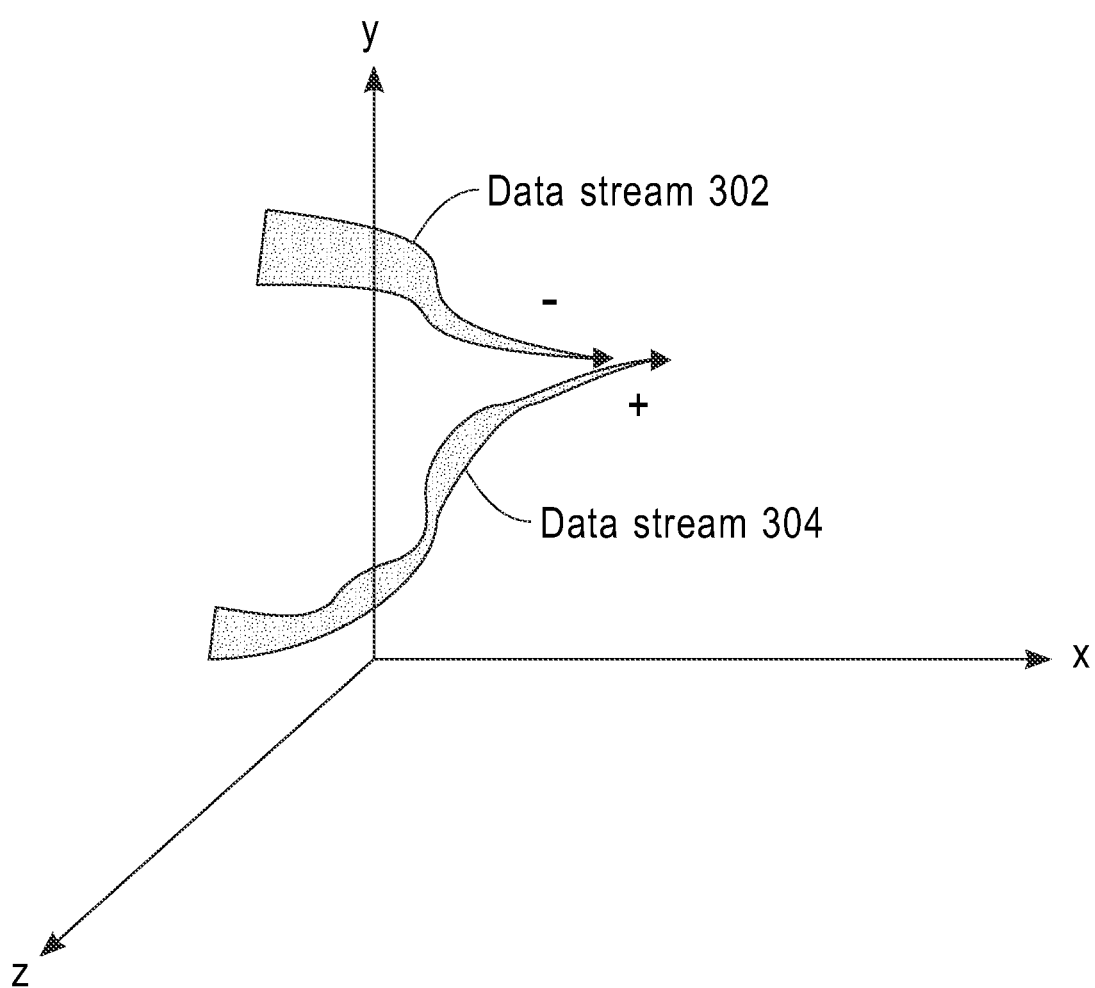
FIG. 3 is a graphical representation of two simultaneous data streams and the possible convergence on a similar topic, in accordance with an embodiment of the present invention.

FIG. 3 is a graphical representation of two simultaneous data streams and the possible convergence on a similar topic during simultaneous meetings, in accordance with an embodiment of the present invention. In one embodiment, meeting program 120 plots two topics as the two topics evolve during concurrent meetings sending data from client devices 104 and 106 to server 102 via network 108.

In depicted graphical representation 300, data stream 302, which is received from client device 104, and data stream 304, which is received from client device 106 are graphical representations of topics being discussed in separate meetings both of which are sending data to server 102. In this embodiment, meeting program 120 plots the evolution or progression of the topic over time as well as assigning an evolving value based on the productive use and understanding of the topic by the participants of the meeting. Data stream 302 and data stream 304 are about to converge on the same topic, and data stream 302 has a negative assigned value and data stream 304 has a positive assigned value. In an example of the represented merger, the meetings may receive an indication prior to the actual convergence of the topic, and as the topics get closer to converging as well as the assigned values increase in opposition, the identification may change to reflect the helpfulness of linking the meetings.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
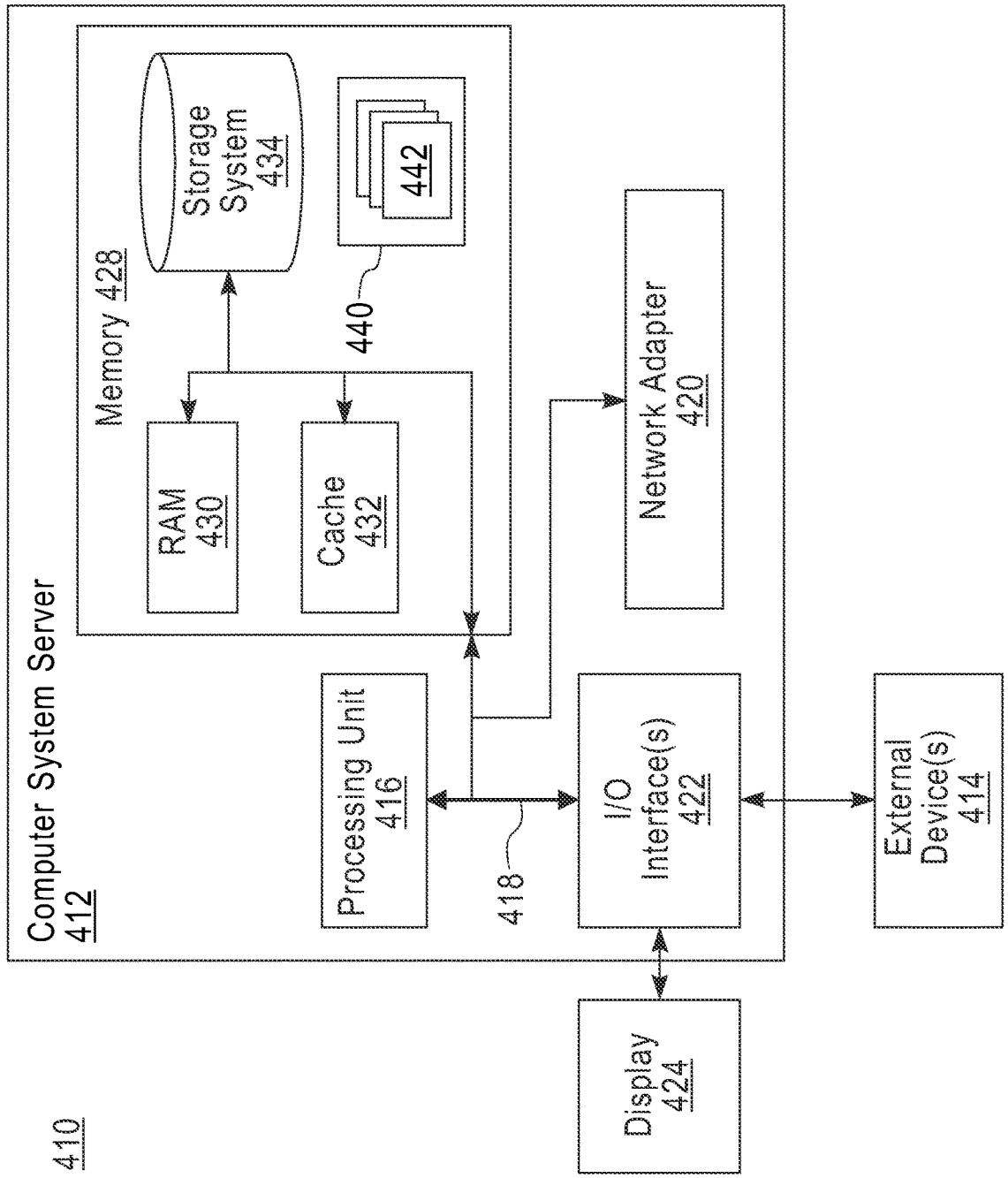
FIG. 4 depicts a cloud computing node, in accordance with an embodiment of the present invention.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 30 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
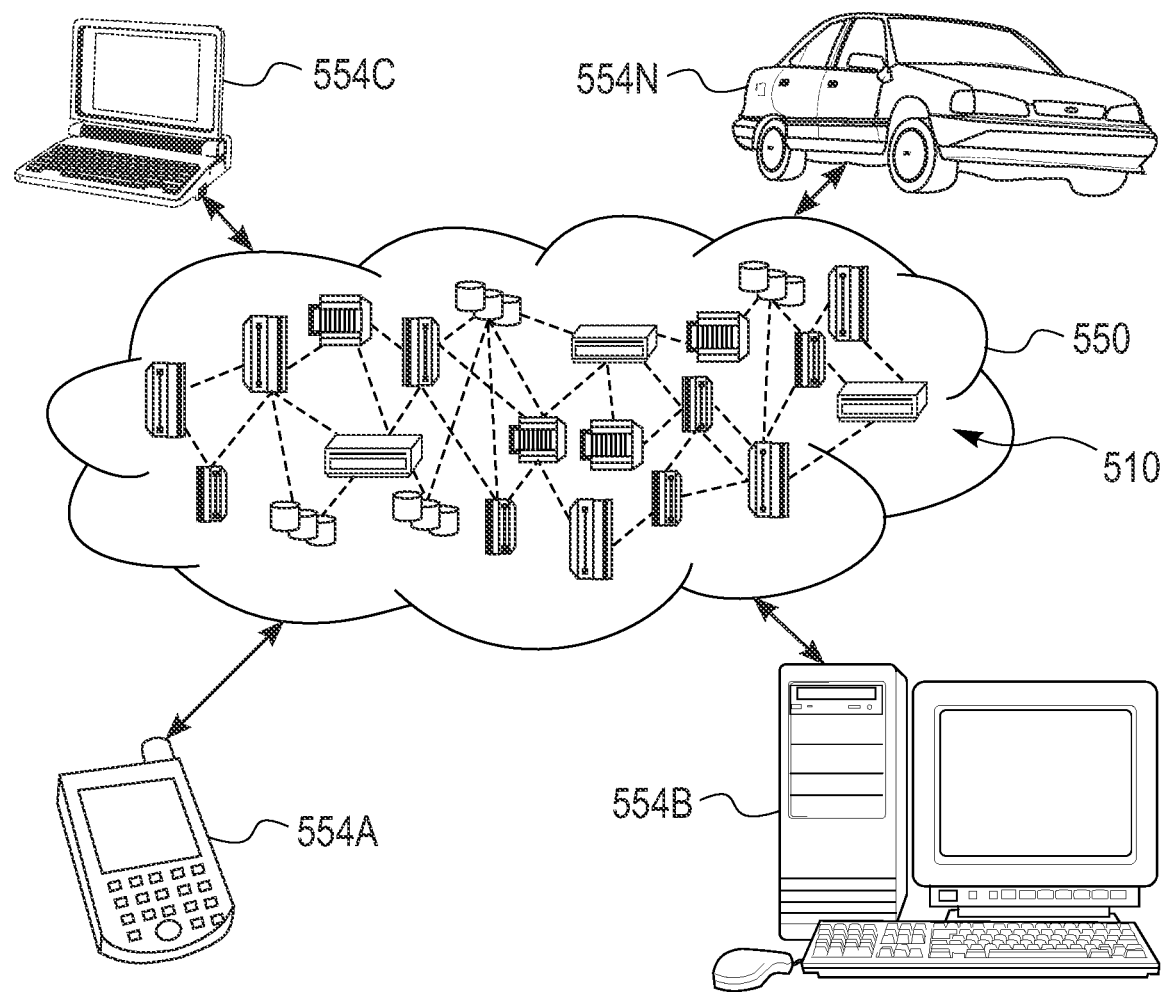
FIG. 5 depicts a cloud computing environment, in accordance with an embodiment of the present invention.

Referring now to FIG. 5 illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
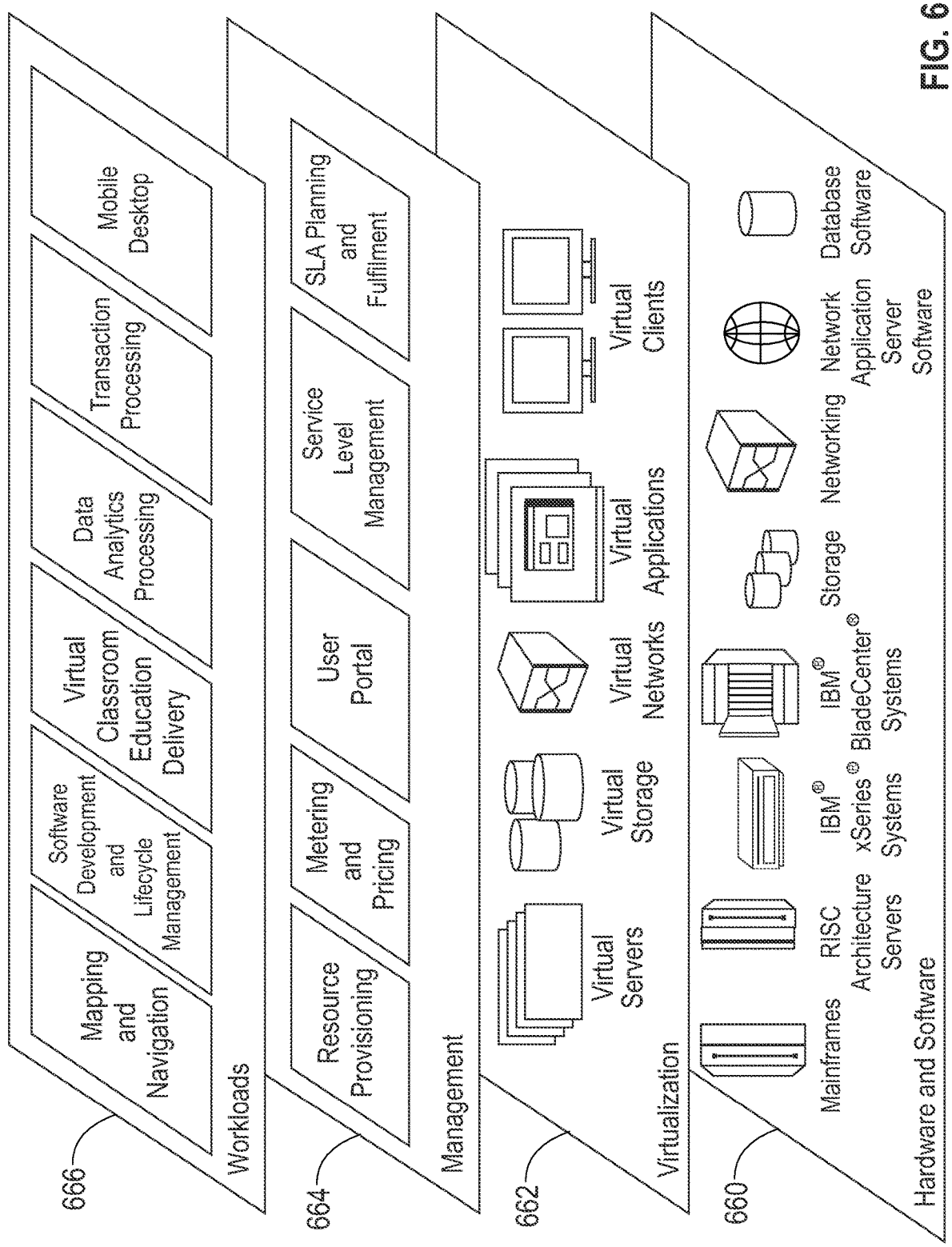
FIG. 6 depicts abstraction model layers, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes; RISC (Reduced Instruction Set Computer); architecture based servers; storage devices; networks and networking components. In some embodiments, software components include network application server software.

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile device.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for comparing a plurality topics to trigger an action, the method comprising:
   receiving a first set of data from a first client device;
   determining, by one or more computer processors, a first topic from the first set of data;
   generating, by one or more computer processors, a first productivity value of a first audience for the first topic, wherein the first productivity value is assigned either a positive value or a negative value based on whether the first audience understands the first topic;
   receiving a second set of data from a second client device;
   determining, by one or more computer processors, a second topic from the second set of data;
   generating, by one or more computer processors, a second productivity value of a second audience for the second set of data, wherein the second productivity value is assigned either a positive value or a negative value based on whether the first audience understands the first topic;
   comparing, by one or more computer processors, the first topic to the second topic;
   in response to the first topic and the second topic being similar, determining, by one or more computer processors, a difference between the first productivity value and the second productivity value;
   in response to determining the difference between the first productivity value and the second productivity value is above a first threshold value, triggering, by one or more computer processors, an action that generates a display on both the first client device and the second client device indicating a degree of similarity between the first and the second topic discussed by the first and the second audience respectively;
   continually monitoring the difference between the first productivity value and the second productivity value based on discussions of the first topic and the second topic; and
   in response to the determined difference between the first productivity value and the second productivity value exceeding a second threshold, establishing a tunnel between the first client device and the second client device that allows members of the first audience and the second audience to interact with each other.

2. The method of claim 1, wherein triggering an action comprises:
   sending, by one or more computer processors, an indication, to the first client device, of the second topic indicated by the data from the second client device and the difference between the generated first value and the generated second value;
   predicting, by one or more computer processors, a trend associated with the first and the second topic that reflects a level of understanding of the first and the second audience regarding the first and the second topic;
   linking, by one or more computer processors, the first client device and the second client device;
   modifying the indication to the first client device using the link based on the predicted trend; and
   controlling flow of information between the first audience and the second audience utilizing the link between the first client device and the second client device.

3. The method of claim 2, wherein sending the indication further comprises sending a request for a linkage between the first client device and the second client device, wherein the linkage changes in real time based on one or more of:
   a current value for a level of productive use and understanding of the first topic;
   a current value for a level of productive use and understanding of the second topic; and
   a current determination of whether the first topic is similar to the second topic.

4. The method of claim 1, wherein comparing the first topic to the second topic comprises:
   determining, by one or more computer processors, whether the first topic is similar to the second topic using at least one of latent Dirichlet allocation, Latent Semantic Analysis, and Latent Semantic Indexing on the data from the first client device and the data from the second client device.

5. The method of claim 1, wherein the first set of data from the first client device include one or more of:
   an analysis of text; an indication of a focus of attention of one or more users of the first client device; total activity levels; and physiological measure of persons discussing the topic.

6. The method of claim 1, wherein generating, by one or more computer processors, a first productivity value for the first topic comprises:
   estimating, by one or more computer processors, that no additional data will be received from the first client device based on the data received from the first client device; and
   generating, by one or more computer processors, the first value for a level of productive use and understanding of the first topic based on the data from the first client device and based on the estimation that no additional data will be received from the first client device.

7. The method of claim 1, wherein generating, by one or more computer processors, a first productivity value for the first topic comprises:
   receiving, by one or more computer processors, polling information regarding the first topic indicated by the data from the first client device, wherein the polling information indicates a level of productive use and understanding of the first topic of one or more users of the first client device; and
   generating, by one or more computer processors, a first value for the level of productive use and understanding of the first topic indicated in the received polling information.

8. A computer program product for comparing a plurality of topics to trigger an action, the computer program product comprising:
   one or more computer readable storage media and program instructions stored on the one or more computer readable storage media, the program instructions comprising:
   program instructions to receive a first set of data from a first client device;
   program instructions to determine a first topic from the first set of data;
   program instructions to generate a first productivity value of a first audience for the first topic, wherein the first productivity value is assigned either a positive value or a negative value based on whether the first audience understands the first topic;
   program instructions to receive a second set of data from a second client device;
   program instructions to determine a second topic from the second set of data;
   program instructions to generate a second productivity value of a second audience for the second set of data, wherein the second productivity value is assigned either a positive value or a negative value based on whether the first audience understands the first topic;
   program instructions to compare the first topic to the second topic;
   in response to the first topic and the second topic being similar, program instructions to determine a difference between the first productivity value and the second productivity value;
   in response to determining the difference between the first productivity value and the second productivity value is above a first threshold value, program instructions to trigger an action that generates a display on both the first client device and the second client device indicating a degree of similarity between the first and the second topic discussed by the first and the second audience respectively;
   program instructions to continually monitor the difference between the first productivity value and the second productivity value based on discussions of the first topic and the second topic; and
   program instructions to, in response to the determined difference between the first productivity value and the second productivity value exceeding a second threshold, establish a tunnel between the first client device and the second client device that allows members of the first audience and the second audience to interact with each other.

9. The computer program product of claim 8, wherein program instructions to trigger an action further comprises program instructions to:
   send an indication, to the first client device, of the second topic indicated by the data from the second client device and the difference between the generated first value and the generated second value;
   predict a trend associated with the first and the second topic that reflects a level of understanding of the first and the second audience regarding the first and the second topic;
   link the first client device and the second client device;
   modify the indication to the first client device using the link based on the predicted trend; and
   control flow of information between the first audience and the second audience utilizing the link between the first client device and the second client device.

10. The computer program product of claim 9, wherein program instructions to send the indication further comprises program instructions to send a request for a linkage between the first client device and the second client device, wherein the linkage changes in real time based on one or more of:
   a current value for a level of productive use and understanding of the first topic;
   a current value for a level of productive use and understanding of the second topic; and
   a current determination of whether the first topic is similar to the second topic.

11. The computer program product of claim 8, wherein program instructions to compare the first topic to the second topic comprises program instructions to:
   determine whether the first topic is similar to the second topic using at least one of latent Dirichlet allocation, latent semantic analysis, and latent semantic indexing on the data from the first client device and the data from the second client device.

12. The computer program product of claim 8, wherein the first set of data from the first client device include one or more of:
an analysis of text; an indication of a focus of attention of one or more users of the first client device; total activity levels; and physiological measure of persons discussing the topic.

13. The computer program product of claim 8, wherein program instructions to generate a first productivity value for the first topic comprises program instructions to:
estimate that no additional data will be received from the first client device based on the data received from the first client device; and
generate the first value for a level of productive use and understanding of the first topic based on the data from the first client device and based on the estimation that no additional data will be received from the first client device.

14. The computer program product of claim 8, wherein program instructions to generate a first productivity value for the first topic comprises program instructions to:
receive polling information regarding the first topic indicated by the data from the first client device, wherein the polling information indicates a level of productive use and understanding of the first topic of one or more users of the first client device; and
generate a first value for the level of productive use and understanding of the first topic indicated in the received polling information.

15. A computer system for comparing a plurality topics to trigger an action, the computer system comprising:
one or more computer processors;
one or more computer readable storage media;
program instructions stored on the one or more computer readable storage media for execution by at least one of the one or more computer processors, the program instructions comprising:
program instructions to receive a first set of data from a first client device;
program instructions to determine a first topic from the first set of data;
program instructions to generate a first productivity value of a first audience for the first topic, wherein the first productivity value is assigned either a positive value or a negative value based on whether the first audience understands the first topic;
program instructions to receive a second set of data from a second client device;
program instructions to determine a second topic from the second set of data;
program instructions to generate a second productivity value of a second audience for the second set of data, wherein the second productivity value is assigned either a positive value or a negative value based on whether the first audience understands the first topic;
program instructions to compare the first topic to the second topic;
in response to the first topic and the second topic being similar, program instructions to determine a difference between the first productivity value and the second productivity value;
in response to determining the difference between the first productivity value and the second productivity value is above a first threshold value, program instructions to trigger an action that generates a display on both the first client device and the second client device indicating a degree of similarity between the first and the second topic discussed by the first and the second audience respectively;
program instructions to continually monitor the difference between the first productivity value and the second productivity value based on discussions of the first topic and the second topic; and
program instructions to, in response to the determined difference between the first productivity value and the second productivity value exceeding a second threshold, establish a tunnel between the first client device and the second client device that allows members of the first audience and the second audience to interact with each other.

16. The computer system of claim 15, wherein program instructions trigger an action further comprises program instructions to:
send an indication, to the first client device, of the second topic indicated by the data from the second client device and the difference between the generated first value and the generated second value;
predict a trend associated with the first and the second topic that reflects a level of understanding of the first and the second audience regarding the first and the second topic;
link the first client device and the second client device;
modify the indication to the first client device using the link based on the predicted trend; and
control flow of information between the first audience and the second audience utilizing the link between the first client device and the second client device.

17. The computer system of claim 16, wherein program instructions send the indication further comprises program instructions to send a request for a linkage between the first client device and the second client device, wherein the linkage changes in real time based on one or more of:
a current value for a level of productive use and understanding of the first topic;
a current value for a level of productive use and understanding of the second topic; and
a current determination of whether the first topic is similar to the second topic.

18. The computer system of claim 15, wherein program instructions to compare the first topic to the second topic comprises program instructions to:
determine whether the first topic is similar to the second topic using at least one of latent Dirichlet allocation, latent semantic analysis, and latent semantic indexing on the data from the first client device and the data from the second client device.

19. The computer system of claim 15, wherein the first set of data from the first client device include one or more of:
an analysis of text; an indication of a focus of attention of one or more users of the first client device; total activity levels; and physiological measure of persons discussing the topic.

20. The computer system of claim 15, wherein program instructions to generate a first productivity value for the first topic comprises program instructions to:
estimate that no additional data will be received from the first client device based on the data received from the first client device; and generate the first value for a level of productive use and understanding of the first topic based on the data from the first client device and based on the estimation that no additional data will be received from the first client device.

* * * * *